O. ZACHOW.
GASOLENE SUPPLYING ATTACHMENT FOR AUTOMOBILES, &c.
APPLICATION FILED AUG. 4, 1909.
980,041.
Patented Dec. 27, 1910.
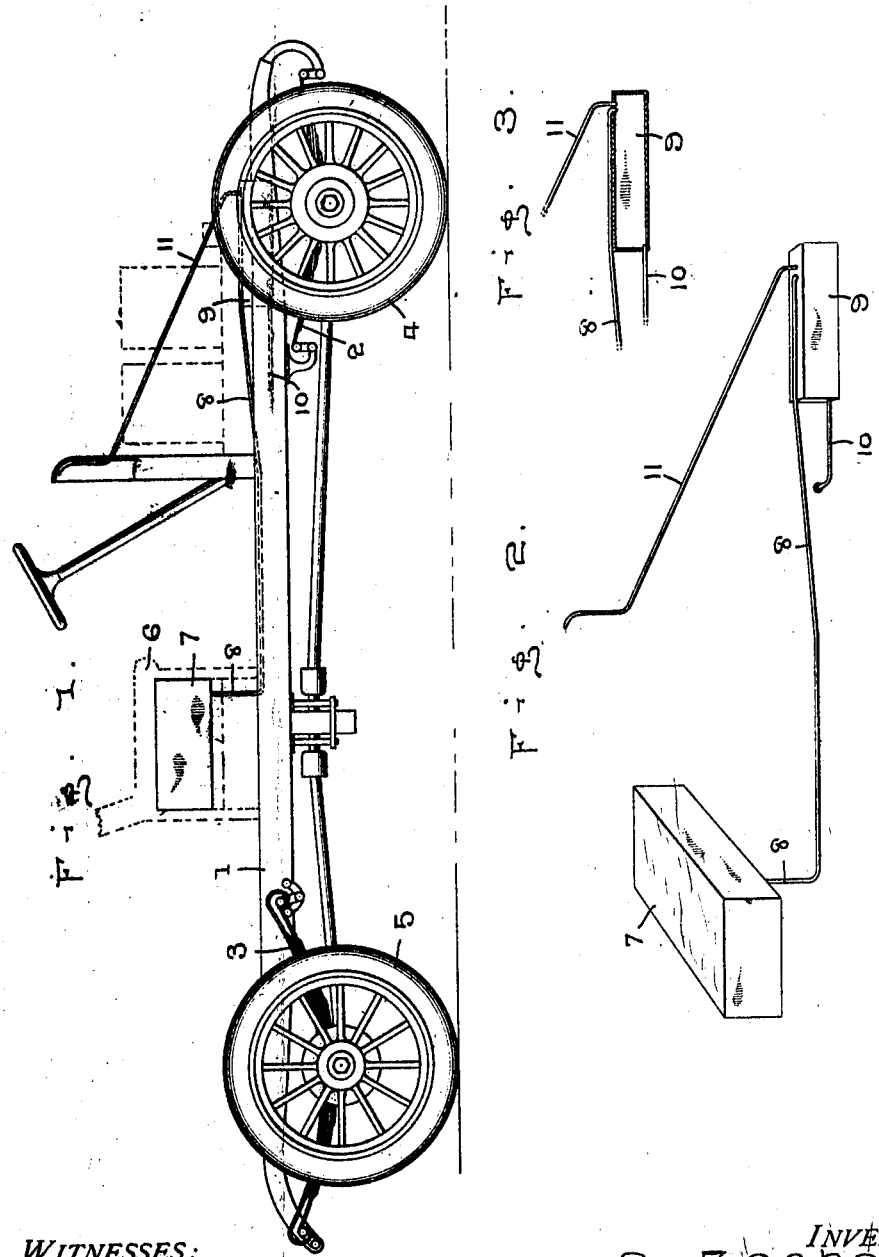
WITNESSES:
INVENTOR
O. Zachow
BY
W. J. FitzGerald
Attorney

UNITED STATES PATENT OFFICE.

OTTO ZACHOW, OF CLINTONVILLE, WISCONSIN.

GASOLENE-SUPPLYING ATTACHMENT FOR AUTOMOBILES, &c.

980,041.  Specification of Letters Patent.  Patented Dec. 27, 1910.

Application filed August 4, 1909. Serial No. 511,258.

*To all whom it may concern:*

Be it known that I, OTTO ZACHOW, a citizen of the United States, residing at Clintonville, in the county of Waupaca and State of Wisconsin, have invented certain new and useful Improvements in Gasolene-Supplying Attachments for Automobiles, &c.; and I do hereby declare the following to be a full, clear, and exact description of the invention, such as will enable others skilled in the art to which it appertains to make and use the same.

My invention relates to new and useful improvements in attachments for motor vehicles and especially to the class relating to the arrangement of fuel-holding tanks.

An object of my invention is to provide an arrangement whereby when the motor vehicles is climbing a grade a constant supply of fuel will be delivered to the carbureter and also to automatically supply an auxiliary reservoir when the vehicle is on level ground or going down grade. Since it is well known that when a motor vehicle is climbing a steep grade it often occurs that because of the angle of the vehicle, it is impossible to supply the fuel to the carbureter; it is therefore my purpose to overcome this objectionable feature.

Other objects will be brought out more fully in the following specification and claim.

Referring to the drawing which forms a part of the accompanying specification, Figure 1 is a vertical side elevation of a motor vehicle showing the arrangement of the fuel supplying mechanism. Fig. 2 is a detailed perspective view of the fuel supplying mechanism. Fig. 3 is a transverse sectional view of the auxiliary tank showing the supply pipes and vent pipe.

In carrying out my invention I employ in connection with the usual or preferred form of frame 1 of a motor vehicle carried by forward springs 2 and rear springs 3 of the usual running gear 4, 5, a fuel tank 7, which is suitably supported in elevated position within the supporting means of a seat 6, said supporting means for said seat being mounted upon said frame. A supply pipe 8 for said tank, connects with the bottom of the latter and is suitably carried forward along the frame 1 and connected to an additional or auxiliary fuel tank 9, also supported upon the frame 1. A pipe 10 also connects with the tank 9 and communicates with a carbureter, not shown; and a venting pipe 11, connecting with the auxiliary fuel tank 9 in its upper portion, extends upwardly and rearwardly and connects with the upper end of the dash board, said pipe being adapted for the ready escape of air therethrough from the auxiliary fuel tank 9 without coming in contact with the sparking apparatus, the purpose of which is apparent. It will be noted that by means of this arrangement a supply of the liquid or gasolene will be always maintained irrespective of the position of the machine or engine, as in climbing a grade, or descending the same or traveling on a plane.

At any moment when the vehicle is on a level or down grade fuel will be automatically conveyed to the auxiliary tank 9 by means of gravity and the fuel will remain in the auxiliary tank until the vehicle is on such an up grade as will prevent the main tank 7 from supplying fuel to the carbureter as under ordinary conditions.

I propose to make the auxiliary tank of such a size as to carry a gallon, more or less, of fuel which will usually be ample to carry the vehicle up a continuous grade of ten or fifteen miles, it being remembered, that when a level section of roadway is reached, the auxiliary tank will be refilled for instant use.

What I claim is:—

The combination with a main fuel supply tank; of an auxiliary supply tank arranged in a plane below that of said main tank, a pipe connecting said tanks, an outlet pipe leading from the rear lower portion of said auxiliary tank, and a vent pipe in communication with the upper side of said auxiliary tank and leading upwardly and rearwardly to a point at a higher level than said main supply tank.

In testimony whereof I have signed my name to this specification in the presence of two subscribing witnesses.

OTTO ZACHOW.

Witnesses:
C. A. NEALE,
F. H. FRENCH.